United States Patent [19]

Takeshita et al.

[11] 4,385,336
[45] May 24, 1983

[54] CURRENT SUPPLYING CIRCUIT WITH SHORTED-TO-GROUND FAULT DETECTING FUNCTION

[75] Inventors: Tetsuo Takeshita; Junjiro Kitano, both of Yokohama; Koichi Hagishima, Iruma, all of Japan

[73] Assignees: Hitachi, Ltd.; Nippon Telegraph & Telephone Public Corporation, both of Tokyo, Japan

[21] Appl. No.: 213,010

[22] Filed: Dec. 4, 1980

[30] Foreign Application Priority Data

Dec. 5, 1979 [JP] Japan .................................. 54-156796

[51] Int. Cl.³ .......................... H02H 9/08; H04M 3/08
[52] U.S. Cl. .................................. 361/42; 179/18 FA
[58] Field of Search ................... 361/42, 45, 49, 58, 361/93, 87, 50, 86; 323/277, 278; 179/16 AA, 18 FA, 70, 77

[56] References Cited

U.S. PATENT DOCUMENTS 3,529,210 9/1970 Ito et al. ............................. 361/58
3,548,259 12/1970 McDonald ......................... 361/45
3,555,359 1/1971 Morris et al. ..................... 361/86 X
4,156,263 5/1979 Comerford et al. .................. 361/42

Primary Examiner—Reinhard J. Eisenzopf
Attorney, Agent, or Firm—Antonelli, Terry & Wands

[57] ABSTRACT

This invention relates to a current supplying circuit for supplying a current to a terminal apparatus through a ring line and a tip line which are connected through resistance elements to a potential source and ground, respectively. This current supplying circuit includes respective detectors for generating first and second detection signals of amplitudes proportional to the currents flowing in the ring and tip lines, respectively, a circuit for generating a reference signal, and a comparator for comparing the signal difference between the first and second detection signals and the reference signal so as to produce a signal in accordance with the compared result, thus a shorted-to-ground fault on the ring line or tip line being detected by monitoring the signal produced in accordance with the compared result. After the shorted-to-ground fault is detected, the current supplying circuit is protected from breakdown.

11 Claims, 4 Drawing Figures

CURRENT SUPPLYING CIRCUIT WITH SHORTED-TO-GROUND FAULT DETECTING FUNCTION

The present invention relates to current supplying circuits for use in a subscriber circuit for supplying speech signals to a subscriber terminal, in a telephone exchange or the like, and particularly to the method of detecting a shorted-to-ground fault and protecting against damage therefrom to the lines in the current supply circuit.

The telephone exchange, has had its control section electronically developed for low cost, small size and reliability, but the subscriber circuit directly interfacing with the subscriber terminal is not electronically developed as yet. Particularly, semiconductor ICs (Integrated Circuits) are not employed for such a circuit.

One of the reasons for not using semiconductor integrated circuits in the subscriber circuit is the possible occurence of a shorted-to-ground fault. The shorted-to-ground fault refers to the state in which either of the two feeding lines (tip and ring lines) connecting the subscriber terminal and the telephone exchange is grounded by a fault. Generally, occurence of the shorted-to-ground fault in the current supplying circuit will cause a large current to flow in one feeding line (ring line) thereby to break down the circuit. Thus, the circuit must be protected from the shorted-to-ground fault by some means.

In the prior art, a current limiting circuit or constant current supplying circuit is generally used for the prevention of such a fault. That is, a current limiting circuit or a constant current circuit is provided in the current supplying circuit in series with a resistor circuit on the ring line. When the current tends to exceed a predetermined value by the shorted-to-ground fault, this current limiting circuit is operated to prevent the current from exceeding the predetermined value. The current limiting circuit has normally no influence on the speech current supplying function but serves to limit current upon fault, for preventing the current supplying circuit from breakdown due to the shorted-to-ground accident. This method of protecting the circuit from breakdown by current limiting has no influence usually and hence cannot inevitably decrease the shorted current greatly. If, now, the resistance value of the resistor circuit on the ring line is taken as $R_A$, that on the tip line side as $R_B$ and the source voltage as E, then the maximum current of $I_0 = E/(R_A + R_B)$ flows at the normal time. Therefore, a current $I_1$ for operating the current limiting circuit must satisfy the condition:

$$I_0 < I_1$$

This means that if the short circuiting resistance becomes small upon short circuiting, current of $I_1$ flows. If the resistance on the shorted line side is zero, the power of $P = I_1 \times E(W)$ is dissipated only in the resistor circuit on the ring line, which provides adverse effects. In other words, there is useless power consumption of P(W) with use of the conventional preventing means for the shorted-to-ground fault. Moreover, such conventional method has a drawback in that it cannot instantly detect the occurence of shorted-to-ground fault and cope with the fault.

On the other hand, a fault detecting means may be provided to monitor the current on the tip line of the feeding lines, in which case, if the current on the tip line is reduced to zero, occurence of a shorted-to-ground fault is detected. This method, however, presents the following problems. Since a leakage resistance generally exists between the lines, the current flowing in the tip line is not reduced to zero upon being shorted-to-ground, thereby degrading the detecting precision. Moreover, if a line is shorted through an impedance, a current flows in the tip line making it imposible to detect zero current, and also the excessive current in the ring line cannot be prevented.

It is an object of the invention to provide a current supplying circuit capable of instantly detecting the occurence of a shorted-to-ground fault in current carrying lines with good accuracy.

It is another object of the invention to provide a current supplying circuit capable of preventing the circuit from breakdown upon being shorted-to-ground and from useless power consumption and of servicing to make the system be small sized.

It is still another object of the invention to provide a current supplying circuit capable of automatically releasing the shorted-to-ground preventing function when the shorted-to-ground fault is repaired or removed.

It is a further object of the invention to provide a current supplying circuit of low cost which is simple in construction and suited for being formed as a semiconductor integrated circuit.

In the current supplying circuits according to the present invention a shorted-to-ground fault can be detected instantly and accurately, by detecting the values of currents flowing through the tip and ring lines to generate first and second detection signals corresponding to each current, by comparing the difference signal between the first and second detection signals with a predetermined reference signal, by outputting a discrimination signal which indicates whether the difference signal exceeds the reference signal or not, and by supervising the discrimination signal output, the current supplying circuits utilizing the difference between the currents flowing in the tip and ring lines to indicate when there occurs a shorted-to-ground fault on the lines.

Furthermore, if a circuit is used which will increase the internal resistance of the current supplying circuit in reply to the discrimination signal output, the current supplying circuit can be protected from the shorted-to-ground fault.

And, in the current supplying circuits according to the present invention there can be provided such functions as to set up different reference signals and alternatively select the different reference signals in reply to the discrimination signal output.

And, the current supplying circuits according to the present invention mainly comprise transistors and resistors.

The present invention will be further described with reference to the accompanying drawings, in which.

A current supplying circuit according to the invention will first be described briefly with reference to FIG. 1.

Figure 1:
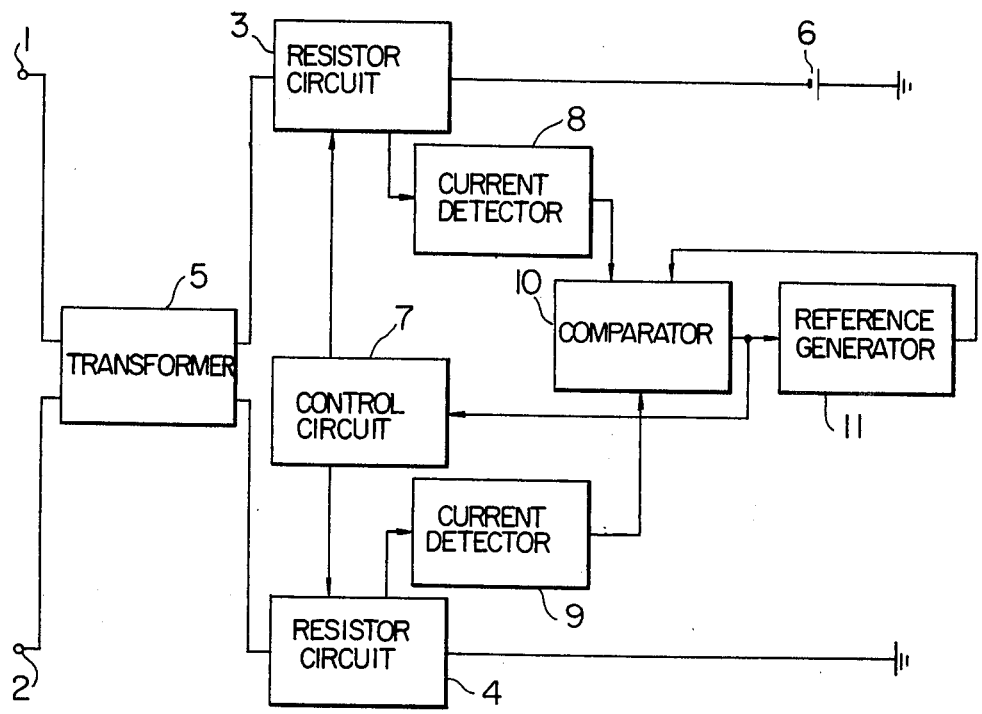
FIG. 1 is a block diagram of one embodiment of a current supplying circuit of the invention.

Referring to FIG. 1, there are shown a terminal 1 to which a ring line is connected, and a terminal 2 to which a tip line is connected, a subscriber terminal such as a telephone set being connected through the tip and ring lines to the terminals 1 and 2. This current supplying circuit includes ring-line side and tip line side resistor circuits 3 and 4 serving a speech current supplying function and each having usually a dc resistance of about 200Ω, a transformer 5 serving to prevent an AC signal from being leaked from the telephone set or other portions to the current supplying circuit and being attenuated thereby, a battery 6 for supplying power to the speech current supplying circuit, a control circuit 7 for controlling the internal resistance of the speech current supplying circuit, current detectors 8 and 9 for detecting the currents on the ring and tip lines, a reference signal generating circuit 11, and a current difference detecting comparator 10 for taking the difference between the ring line-side and tip line-side currents detected by the current detectors 8 and 9 and examining whether the difference is larger or smaller than the reference signal (or threshold value) generated by the reference signal generating circuit 11.

The operation of the current supplying circuit of FIG. 1 will hereinafter be described. The current detectors 8 and 9 detect the currents on the ring line and tip line, respectively, and the detected currents are compared by the comparator 10. If a shorted-to-ground accident does not occur (the resistance to ground is infinite, ∞), the difference between the currents is substantially zero, with the result that the current difference detecting comparator 10 produces no output. If a shorted-to-ground fault occurs, the current difference becomes large, and when it exceeds a predetermined value generated by the reference signal generator 11, the comparator 10 is operated to produce information showing the shorted-to-ground state. This reference signal or threshold value is effective to prevent erroneous indication of a shorted-to-ground fault even if a difference between the ring-line and tip-line currents is created due to the mis-match of manufactured circuits, AC induction and other causes. The detection of the current difference is also effective since it is not affected by the length of the subscriber's lines. When the comparator 10 detects a shorted-to-ground fault, the output produced from the comparator 10 actuates the control circuit 7 thereby to control the internal resistance of the speech current supplying circuit to increase the resistance between the ring-side resistor circuit 3 and the tip-side resistor circuit 4. Consequently, the current and power consumption upon occurrence of a shorted-to-ground fault can be decreased. At this time, since the ring-side resistance and tip-side resistance are increased by the control circuit 7, the outputs of the detectors 8 and 9 decrease with increase of the internal resistance, depending on the magnitude of the shorted-to-ground resistance $R_G$ and the increment of the internal resistance. Consequently, the difference between the currents in the ring and tip lines decreases. If the current difference is reduced to a value less than the predetermined threshold value, the comparator 10 will no longer detect the phenomenon as a shorted-to-ground fault. As a result, the control circuit 7 acts to return the internal resistance to the original value. Under this condition, the circuit of FIG. 1 may oscillate. In order to prevent this, the embodiment is constructed to apply the output of the comparator 10 to the reference signal generator 11 after the comparator 10 has once detected the shorted-to-ground fault, thereby to decrease the threshold value. Thus, after the comparator 10 detects the shorted-to-ground fault, the control circuit 7 increases the internal resistance to decrease the difference between the two currents in the ring-line and tip-line currents, but since the threshold value to be compared with the difference is decreased, the above-mentioned oscillation can be prevented.

Figure 2:
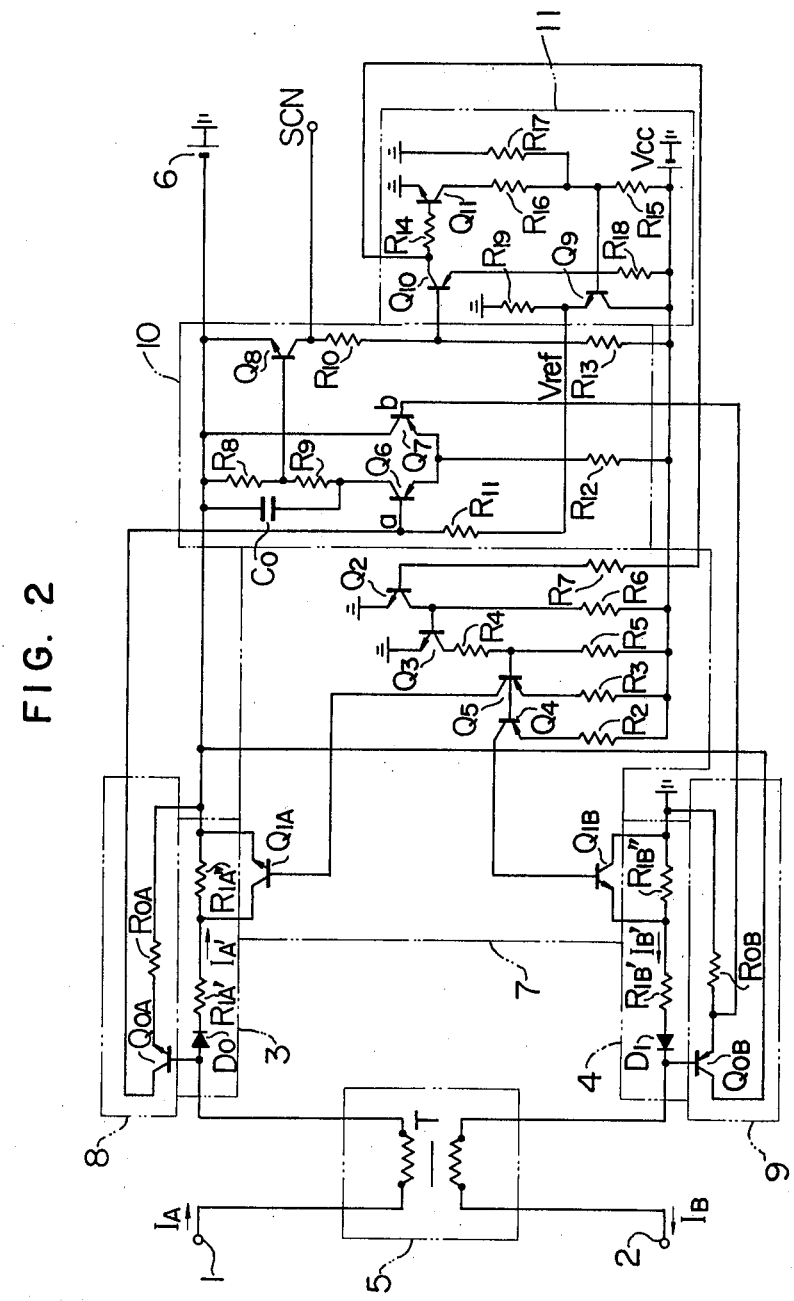
FIG. 2 shows a specific circuit arrangement of FIG. 1.

FIG. 2 shows a specific circuit arrangement of one embodiment of the invention. The portions surrounded by one-dot chain lines as shown in FIG. 2 correspond to the respective blocks of FIG. 1.

Referring to FIG. 2, the ring side terminal 1 is connected through a transformer T to the diode-side end of a series circuit of a diode D0 and resistors $R_{1A'}$ and $R_{1A''}$ in the resistor circuit 3. The resistor-side end of the series circuit is connected to the negative electrode of the battery 6 the positive electrode of which is connected to ground. The tip side terminal 2 is connected through the transformer T to the diode-side end of a series circuit of a diode D1 and resistors $R_{1B'}$ and $R_{1B''}$ in the resistor circuit 4, and the resistor-side end of the series circuit is connected to ground. The ring-line side current detector 8 includes as means for generating a first detection signal of an amplitude proportional to the current $I_A$ flowing in the ring line, a transistor $Q_{OA}$ the base of which is connected to the ring line, and a resistor $R_{OA}$ one end of which is connected to the emitter of the transistor $Q_{OA}$ and the other end of which is connected to the negative electrode of the battery 6. Similarly, the tip line-side current detector 9 includes as means for generating a second detection signal of an amplitude proportional to the current $I_B$ flowing in the tip line, a transistor $Q_{OB}$ the base of which is connected to the tip line, and a resistor $R_{OB}$ one end of which is connected to the emitter of the transistor $Q_{OB}$ and the other end of which is connected to ground. The current difference detecting comparator 10 includes a resistor $R_{11}$, a transistor $Q_6$ the base of which is connected to the junction between the collector of the transistor $Q_{OA}$ and the resistor $R_{11}$, a transistor $Q_7$ the base of which is connected to the junction between the emitter of the transistor $Q_{OB}$ and the resistor $R_{OB}$, a series circuit of resistors $R_8$ and $R_9$ connected to the collector of the transistor $Q_6$, a transistor $Q_8$ the base of which is connected to the junction between the resistors $R_8$ and $R_9$, a resistor $R_{12}$ through which the common emitter of the transistors $Q_6$ and $Q_7$ is connected to the positive electrode of a battery $V_{cc}$, a series circuit of resistors $R_{10}$ and $R_{13}$ through which the positive electrode of the battery $V_{cc}$ is connected to the collector of the transistor $Q_8$, and a capacitor $C_O$ connected in parallel with the series circuit of the resistors $R_8$ and $R_9$ and through which the collector of the transistor $Q_6$ is connected to the negative electrode of the battery 6 to which are directly connected to the collector of the transistor $Q_7$ and the emitter of the transistor $Q_8$.

The reference signal generator circuit 11 includes resistors $R_{15}$ and $R_{16}$, a transistor $Q_9$ the base of which is connected to the junction between the resistors $R_{15}$ and $R_{16}$, a transistor $Q_{10}$ the base of which is connected to the junction between the resistors $R_{10}$ and $R_{13}$, a resistor $R_{14}$, a transistor $Q_{11}$ the base of which is connected to the collector of the transistor $Q_{10}$ through the resistor $R_{14}$, the battery $V_{cc}$, a resistor $R_{19}$ through which the emitter of the transistor $Q_9$ is connected to ground, the emitter of the transistor $Q_9$ being also connected to the base of the transistor $Q_6$ through the resistor $R_{11}$, the collector thereof to the positive electrode of the battery $V_{cc}$, a resistor $R_{18}$ through which the emitter of the transistor $Q_{10}$ is connected to the positive electrode of the battery $V_{cc}$, to which the collector of the transistor $Q_{11}$ is connected through the series circuit of the resistors $R_{15}$ and $R_{16}$, and a resistor $R_{17}$ through which the junction between the resistors $R_{15}$ and $R_{16}$ is connected to ground.

The internal resistance control circuit 7 includes a transistor $Q_2$, a resistor $R_7$ through which the collector of the transistor $Q_{10}$ is connected to the base of the transistor $Q_2$, a transistor $Q_3$ the base of which is connected to the collector of the transistor $Q_2$, a resistor $R_4$, transistors $Q_4$ and $Q_5$ the common base of which is connected through the resistor $R_4$ to the collector of the transistor $Q_3$, transistors $Q_{1B}$ and $Q_{1A}$ the bases of which are respectively connected to the collectors of the transistors $Q_4$ and $Q_5$, the emitter of the transistor $Q_{1A}$ being connected to the negative electrode of the battery 6, the collector thereof to the junction between the resistors $R_{1A'}$ and $R_{1A''}$, the emitter of the transistor $Q_{1B}$ to the junction between the resistors $R_{1B'}$ and $R_{1B''}$, the collector thereof to ground, the emitters of the transistors $Q_2$ and $Q_3$ being grounded, and resistors $R_6$, $R_5$, $R_3$ and $R_2$, the collectors of the transistors $Q_2$ and $Q_3$ being connected through the resistor $R_6$ and the series circuit of the resistors $R_4$ and $R_5$ to the positive electrode of the battery $V_{cc}$, the emitters of the transistors $Q_4$ and $Q_5$ connected through the resistors $R_2$ and $R_3$ to the positive electrode of the battery $V_{cc}$.

A terminal SCN connected to the collector of the transistor $Q_8$ is an external monitoring terminal.

When a subscriber's telephone set (not shown) connected to the terminals 1 and 2 through the telephone lines is brought into off-hook condition, a loop current of $I_A$ in the ring line and $I_B$ in the tip line flows through the path-ground→the collector of the transistor $Q_{1B}$→the emitter thereof→the resistor $R_{1B'}$→the diode $D_1$→the transformer T→the tip line→the telephone set→the ring line→the transformer T→the diode $D_0$→the resistor $R_{1A'}$→the collector of the transistor $Q_{1A}$→the emitter thereof→the battery 6. Then, the circuit of the transistor $Q_{0A}$ and resistor $R_{0A}$ generates a signal proportional to the ring line current, while the circuit of the transistor $Q_{0B}$ and resistor $R_{0B}$ generates a signal proportional to the tip line current. Here, it is assumed that the forward voltage drop across the base-emitter path of the transistor $Q_{0A}$ equals that of the transistor $Q_{0B}$, and also the forward voltage drop of the diode $D_0$ equals that of the diode $D_1$. In addition, the dc current amplification factor $h_{FE}$ of the transistors is assumed to be large enough in the following description of the circuit operation.

The emitter potential of the transistor $Q_9$ within the reference signal generator circuit 11 is a threshold voltage or reference signal voltage $V_{ref}$, and since the transistors $Q_8$, $Q_{10}$ and $Q_{11}$ are inoperative before a shorted-to-ground fault is detected, the base potential $V_{B \cdot Q9}$ of the transistor $Q_9$ can be expressed by $$V_{B \cdot Q9} = \frac{R_{17}}{R_{15} + R_{17}} \cdot V_{cc} \quad (1)$$

Therefore, the threshold voltage $V_{ref}$ can be given by $$V_{ref} = V_{B \cdot Q9} - V_{BE \cdot Q9} \quad (2)$$

-continued
$$= \frac{R_{17}}{R_{15} + R_{17}} V_{cc} - V_{BE \cdot Q9}$$

where $V_{BE \cdot Q9}$ represents the base-emitter potential of the transistor $Q_9$.

The operating principle of the ring line-side current detector 8, tip line-side current detector 9 and current difference detecting comparator 10 will be described below. As shown in FIG. 2, the currents flowing through the resistors $R_{1A'}$ and $R_{1B'}$ are approximately equal to the ring-line and tip-line currents $I_A$ and $I_B$, respectively as given by $$I_A \approx I_{A'} \quad (3)$$

$$I_B \approx I_{B'} \quad (4)$$

The potential $V_a$ at point a in the comparator 10 is determined by the transistor $Q_{0A}$ and resistor $R_{0A}$ of the ring line-side current detector 8 as follows:

$$V_a = V_{ref} - \frac{R_{11}}{R_{0A}} \times R_{1A} \times I_{A'} \quad (5)$$

Substitution of Eq. (3) and $R_{0A} = R_{11}$ into Eq. (5) will yield $$V_a = V_{ref} - R_{1A} \times I_A \quad (6)$$

The potential $V_b$ at point b in the tip line-side current detector 9 is determined by the transistor $Q_{0B}$ and resistor $R_{0B}$ as follows:

$$V_b = -R_{1B} \times I_{B'} \quad (7)$$

Substitution of Eq. (4) into Eq. (7) will give $$V_b = -R_{1B} \times I_B \quad (8)$$

Here, if it is assumed that $$R_{1A} = R_{1B} = R_1 \quad (9)$$

the condition under which the transistor $Q_8$ is operative is determined from Eqs. (6), (8), (9) and $V_a < V_b$ as follows:

$$\frac{V_{ref}}{R_1} < (I_A - I_B) \quad (10)$$

From Eq. (10) it will be understood that if the battery line current $I_A$ is larger than the tip line current $I_B$ by more than the threshold voltage $V_{ref}$ divided by the resistance $R_1$, the detector 10 detects the shorted-to-ground fault, with the transistor $Q_6$ being operative and then the transistor $Q_8$ operating.

Occurence of a shorted-to-ground fault will cause an excessive current in the ring line, but will cause little current in the tip line.

When a shorted-to-ground fault is detected, the transistor $Q_8$ becomes operative, thereby to render the transistor $Q_{10}$ operating and also the transistor $Q_2$ in the control circuit 7 operative. Then, the transistor $Q_3$, which has been in conducting state, is turn off, rendering the transistors $Q_4$, $Q_5$, $Q_{1A}$ and $Q_{1B}$ turn off. This results in the release from the short-circuited condition of the resistors $R_{1A''}$ and $R_{1B''}$ within the resistor circuits 3 and 4, respectively. Thus, the resistance values in the resistor circuits 3, 4 are increased from $R_{1A}'$, $R_{1B}'$ to $R_{1A}'+R_{1A}''$, $R_{1B}'+R_{1B}''$, respectively, thereby protecting the speech current supplying circuit from breakdown due to the shorted-to-ground fault.

On the other hand, by monitoring the collector potential of the transistor $Q_8$, the fault on the feeder (ring line, tip line) can be detected externally. That is, when the SCN terminal is at high level, there occurs no shorted-to-ground fault, whereas when it is at low level, a shorted-to-ground fault is present on the feeder.

The reference signal generator circuit 11 will be described below. When a shorted-to-ground fault is detected, the transistor $Q_8$ is turned on to make the transistors $Q_{10}$ and $Q_{11}$ operative. Turning on of the transistor $Q_{11}$ will give the transistor $Q_9$ a base voltage as expressed by $$V_{B \cdot Q_9} = \frac{R_{16}//R_{17}}{R_{15} + (R_{16}//R_{17})} V_{cc} \qquad (11)$$

where $R_{16}//R_{17}$ represents the parallel resultant resistance of the resistors $R_{16}$ and $R_{17}$. The emitter potential $V_{ref}$ of the transistor $Q_9$ at this time is given by $$V_{ref} = \frac{R_{16}//R_{17}}{R_{15} + (R_{16}//R_{17})} V_{cc} - V_{BE \cdot Q_9} \qquad (12)$$

From the comparison of Eq. (12) with Eq. (2) given previously, it will be understood that the emitter potential $V_{ref}$ of Eq. (12) is smaller than the threshold voltage $V_{ref}$ before detection of the shorted-to-ground fault.

Accordingly, even if the resistance values of the resistor circuits 3 and 4 on the ring- and tip-line sides are increased by the detection of the shorted-to-ground fault so as to decrease the currents $I_A$ and $I_B$ the difference between which becomes small, the proper value of the resistance $R_{16}$ for the threshold voltage $V_{ref}$ such as satisfies Eq. (10) will enable the shorted-to-ground fault detecting condition to be maintained. This results in prevention of the circuit oscillation.

While in this embodiment the threshold voltage is reduced to prevent the circuit oscillation, the result of the detection of the shorted-to-ground fault may be applied to a hold circuit after the fault is once detected, the output of the hold circuit being used to render the control circuit 7 operative. However, in this case, when the fault is repaired or removed, the hold circuit must be reset by some means. The merit of this embodiment is to particularly require no such resetting means. According to this embodiment, when the shorted-to-ground fault is removed, the currents $I_A$ and $I_B$ flowing in the ring and tip lines have no difference therebetween, and therebefore, do not to satisfy Eq. (10), and as a result, the comparator 10 produces information of the shorted-to-ground fault being removed. Thus, the threshold voltage $V_{ref}$ is returned to the original voltage at normal time and the control circuit 7 is restored to the original condition. Since the threshold voltage $V_{ref}$ can be changed to the two values-one for detecting the occurence of shorted-to-ground fault and the other for detecting the removement of the shorted-to-ground fault, the occurence and removal of the condition can be automatically detected and treated.

The operation of the capacitor $C_0$ within the comparator 10 will be described. Although it was described previously that the difference between the ring and tip line currents is caused only by a shorted-to-ground fault, an in-phase mode signal is actually caused by AC induction and applied through the subscriber's lines to the comparator 10 as a current difference between the ring-line current and tip-line current. In order to prevent erroneous operation due to the AC signal of in-phase mode, the capacitor $C_0$ is additionally used to smooth the AC signal. This capacitor can give the comparator 10 a great resistance to external AC noise.

While in the above embodiment any shorted-to-ground fault is detected by the detection of the difference between the ring line current and the tip line current, the fault may be detected by the current in either of the ring and tip lines if high precision is not required. For example, since the current flowing in the subscriber's line is determined by the length of the line, a threshold value is provided for each subscriber's lines and compared with the detected value of the current flowing through either one of the paired lines, thereby enabling the presence or absence of a shorted-to-ground fault to be detected. However, this method needs a different threshold value for each subscriber and makes it difficult to detect the shorted-to-ground fault which is caused through a considerably large resistance on a line.

As shown in FIG. 2, the method of detecting the currents flowing in the ring and tip lines has advantages that a threshold value can be determined independent of the line length and that any shorted-to-ground fault can be detected almost without effect of the resistance through which the line is shorted to ground. In other words, since the currents flowing in both lines are substantially the same at normal times and a current difference occurs only at shorted-to-ground time, a threshold value can simply be determined and any shorted-to-ground fault can be detected with high precision by utilizing the above fact.

Figure 3:
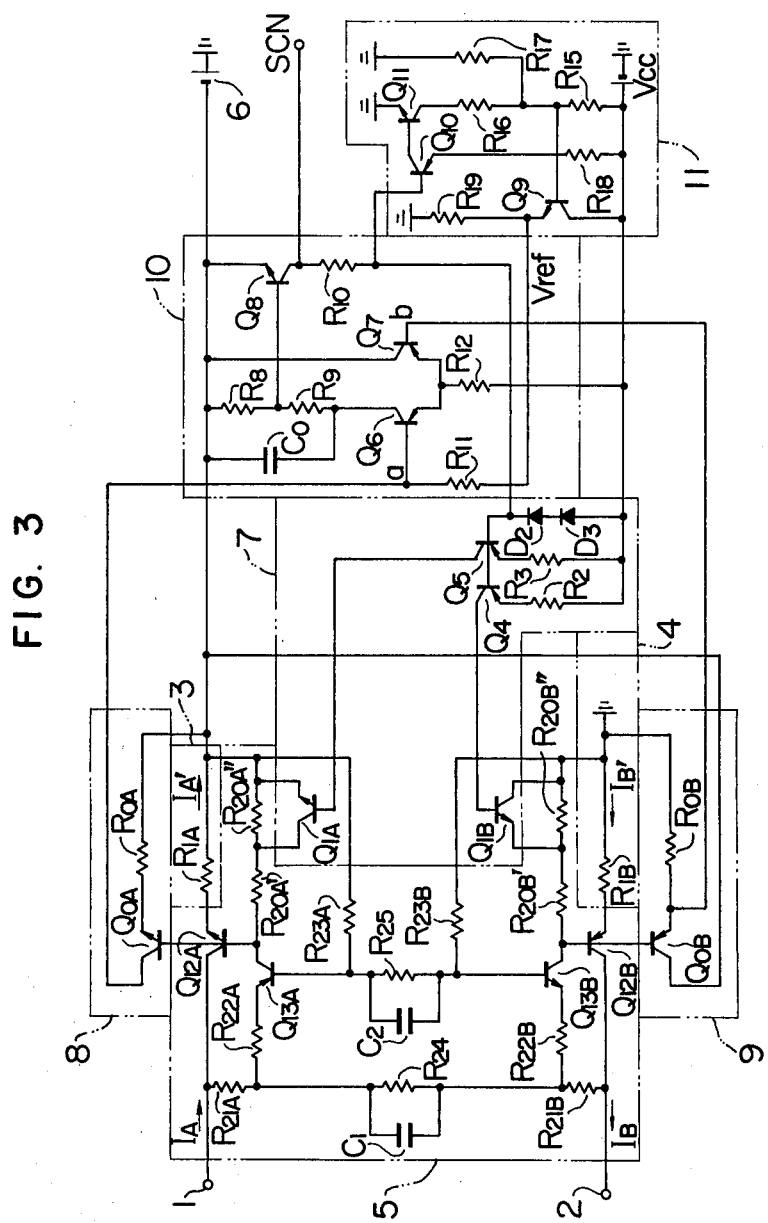

FIG. 3 shows another embodiment of the invention as a modification of the electronic current supplying circuit of FIG. 2. Referring to FIG. 3, there is shown the circuit 5 which is surrounded by a one-dot chain line and includes transistors $Q_{12A}$, $Q_{12B}$, $Q_{13A}$ and $Q_{13B}$, resistors $R_{20A}'$, $R_{20B}'$, $R_{20A}''$, $R_{20B}''$, $R_{21A}$, $R_{21B}$, $R_{22A}$, $R_{22B}$, $R_{23A}$, $R_{23B}$, $R_{24}$ and $R_{25}$ and capacitors $C_1$ and $C_2$. The circuit 5 has an equivalent function to that of the transformer T in FIG. 2, and is an element of the current supplying circuit, which is disclosed in the Japanese Patent Application No. 115766/1978 (laid-open to public inspection on Mar. 25, 1980 as Japanese Patent Laid-open No. 42449/1980), U.S. Pat. Application Ser. No. 78469 (filed on Sept. 24, 1979), now U.S. Pat. No. 4,315,206 and Canadian Pat. Application Ser. No. 336004 (filed on Sept. 20, 1979) both the latters being based on the former Japanese Pat. Applicaton. Therefore, the explanation of circuit 5 will be briefly described hereinafter.

The transistors $Q_{12A}$ and $Q_{13A}$, resistors $R_{1A}$, $R_{20A}$ ($=R_{20A}'+R_{20A}''$), $R_{21A}$, $R_{22A}$, $R_{23A}$, $R_{24}$ and $R_{25}$ and capacitors $C_1$ and $C_2$ constitute a negative feedback circuit, and the transistors $Q_{12B}$ and $Q_{13B}$ and resistors $R_{1B}$, $R_{20B}$ ($=R_{20B}'+R_{20B}''$), $R_{21B}$, $R_{22B}$, $R_{23B}$, $R_{24}$, and $R_{25}$ and capacitors $C_1$ and $C_2$ constitute another negative feedback circuit. This circuit 5 has the same impedance as that of the transformer T for AC. The resistor $R_{1A}$ carries a current $I_A'$ substantially equal to the ring line current $I_A$, and the resistor $R_{1B}$ carries a current $I_B'$ substantially equal to the tip line current $I_B$. The factors for determining the internal resistance of this current supplying circuit are the resistance ratio of resistors $R_{1A}$, $R_{20A}$ ($=R_{20A'}+R_{20A''}$), $R_{21A}$, $R_{22A}$ and $R_{24}$ and the resistance ratio of the resistors $R_{1B}$, $R_{20B}$ ($=R_{20B'}+R_{20B''}$), $R_{21B}$, $R_{22B}$ and $R_{24}$. The transistors $Q_{12A}$ and $Q_{13A}$ and resistors $R_{21A}$ and $R_{22A}$ constitute a negative feedback loop and the transistors $Q_{12B}$ and $Q_{13B}$ and resistors $R_{21B}$ and $R_{22B}$ constitute another feedback loop. Therefore, the decrease of the values of the resistors $R_{20A}$ and $R_{20B}$ will reduce the amount of negative feedback, thereby increasing the internal resistance. The internal resistance control circuit 7 is formed of the transistors $Q_{1A}$, $Q_{1B}$, $Q_4$ and $Q_5$ and resistors $R_2$ and $R_3$ and diodes $D_2$ and $D_3$. As is apparent from the previous description, if the transistors $Q_{1A}$ and $Q_{1B}$ are turned on, the resistances $R_{20A}$ and $R_{20B}$ are increased from the values of $R_{20A'}+R_{20A''}$, and $R_{20B'}+R_{20B''}$ to $R_{20A'}$ and $R_{20B'}$, respectively.

Thus, the transistors $Q_{1A}$, $Q_{1B}$, $Q_4$ and $Q_5$ are operated in a reverse manner to the case of FIG. 2, so that they are inoperative at normal times, and become operative in response to the conductive state of the transistor $Q_8$ when a shorted-to-ground fault is detected. The constructions and operations of the other circuits are particularly not different from those of FIG. 2. However, since the base-emitter paths of the transistors $Q_{12A}$ and $Q_{12B}$ have the same functions as those of the diodes $D_0$ and $D_1$, the diodes $D_0$ and $D_1$ can be omitted by connecting the bases of the transistors $Q_{0A}$ and $Q_{0B}$ to the bases of the transistors $Q_{12A}$ and $Q_{12B}$.

Figure 4:
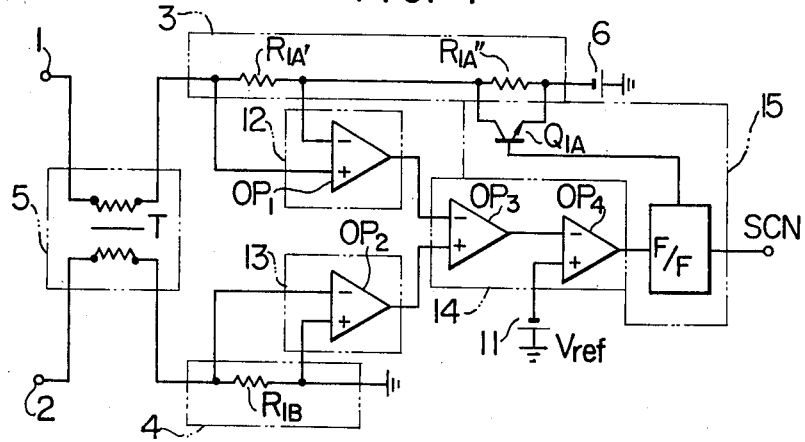
FIGS. 3 and 4 show other embodiments of the invention.

FIG. 4 shows still another embodiment, by which any shorted-to-ground fault can be detected by detecting the potential difference between the ring and tip lines. Referring to FIG. 4, there are shown potential difference detectors 12 and 13 for detecting the voltages across the resistor $R_{1A'}$ on the ring-line side and resistor $R_{1B}$ on the tip-line side, these detectors 12 and 13 being formed of operational amplifiers $OP_1$ and $OP_2$, respectively. Shown at 14 is a potential difference detecting comparator which takes the difference between the voltages detected by the detectors 12 and 13 and compares it with the threshold value formed by the reference signal generator 11, this comparator being formed of operational amplifiers $OP_3$ and $OP_4$. A control circuit 15 is provided to control the internal resistance of the speech current supplying circuit, and formed of a flip-flop F/F and the transistor $Q_{1A}$. The other elements designated by like reference characters correspond to the same elements as those of FIGS. 2 and 3.

Under normal condition with no shorted-to-ground fault, the flip-flop F/F is in the set state to make the transistor $Q_{1A}$ operative, with the resistor $R_{1A''}$ being shorted. If, now, the value of the resistor $R_{1A'}$ is equal to that of the resistor $R_{1B}$, the current $I_A$ flowing in the ring line and the current $I_B$ flowing in the tip line are substantially the same at normal time, and thus the operational amplifiers $OP_1$ and $OP_2$ produce approximately equal output levels. This results in substantially zero level at the output of the operational amplifier $OP_3$. The operational amplifier $OP_4$ decides if the input thereto is higher than the threshold value $V_{ref}$ and in such case produces a low-level output.

When a shorted-to-ground fault occurs, the current flowing in the ring line becomes excessive with the result that the operational amplifier $OP_1$ produces a higher level output. On the other hand, substantially zero current flows in the ring line, making the output of the operational amplifier $OP_2$ at a lower level. As a result, the operational amplifier $OP_3$ produces an output the level of which corresponds to the output difference between the operational amplifiers $OP_1$ and $OP_2$. When this output level is lower than the threshold value $V_{ref}$, the operational amplifier $OP_4$ is operative to produce a higher level output, by which the flip-flop F/F is reset to turn off the transistor $Q_{1A}$. Thus, the value of the resistor $R_{1A}$ within the resistor circuit 3 is increased from $R_{1A'}$ to $R_{1A'}+R_{1A''}$, thereby limiting the current flowing in the ring line to protect the associated circuits from the shorted-to-ground fault. In this embodiment, the increase of the internal resistance decreases the potential difference, and consequently when the difference becomes lower than a predetermined threshold value, $V_{ref}$, the potential difference detecting comparator 14 detects a shorted-to-ground fault, but there is no trouble since the shorted-to-ground state is held by the flip-flop F/F. However, when the shorted-to-ground state is removed, the flip-flop F/F must be newly set by another means. While in this embodiment, the protection from shorted-to-ground fault is performed by increasing only the resistance on the ring side, it should be understood that the protection may be performed in a manner similar to the cases of FIGS. 2 and 3.

Moreover, while in the above embodiments the circuit protection upon detection of a shorted-to-ground state is performed by increasing the internal resistance, it should be understood that upon detection of a shorted-to-ground fault the circuit associated therewith may be disconnected or the voltage be lowered.

According to the invention, as described above, upon occurence of shorted-to-ground fault, the internal resistance of the speech current supplying circuit is increased thereby to protect the circuit from breakdown and prevent unuseful power consumption, which leads to a small sized apparatus. Moreover, the reference signal generator circuit is provided with a function to make the two threshold values for shorted-to-ground time and normal time, and one of these threshold or reference values is selected for each state. Thus, the operation margin can be kept for normal operation, and oscillation can be prevented upon occurrence of a shorted-to-ground fault. In addition, there is provided a function to detect the difference between the two currents flowing in the ring and tip lines, which function enables determination of the threshold value independent of the line length. Furthermore, the current difference detecting comparator is provided with a circuit which is insensitive to AC signals, thereby preventing its erroneous operation due to AC noise such as AC induction.

Although the circuit arrangement of FIG. 3 has a great number of elements, or transistors, resistors and diodes, these elements may be integrated with low cost.

What is claimed is:

1. A current supplying circuit for supplying a current to a terminal apparatus connected between a ring line and a tip line which are connected through resistance elements to a potential source and ground respectively, said current supplying circuit comprising:
    means for generating a first detection signal having an amplitude proportional to a ring line current flowing in said ring line;
    means for generating a second detection signal having an amplitude proportional to a tip current flowing in said tip line;
    means for generating a predeterined reference signal;
    means for producing a difference signal which represents the difference between said first and second detection signals; and means for comparing said difference signal with said reference signal and then producing a discrimination signal which indicates whether the difference signal exceeds the reference signal or not; said ring current and tip current being equal in value when a shorted-to-ground fault does not occur because said currents flow in said ring and tip lines only through said terminal apparatus, said discrimination signal being used for detecting the shorted-to-ground fault;

wherein said reference signal generating means has a function to selectively generate first and second reference signals of different levels and holds the output signal from said comparing means by generating either of said first or second reference signal in accordance with the output signal from the comparing means.

2. A current supplying circuit for supplying a current to a terminal apparatus connected between a ring line and a tip line which are connected through resistance elements to a potential source and ground respectively, said current supplying circuit comprising:

means for generating a first detection signal having an amplitude proportional to a ring line current flowing in said ring line;

means for generating a second detection signal having an amplitude proportional to a tip current flowing in said tip line;

means for generating a predetermined reference signal;

means for producing a difference signal which represents the difference between said first and second detection signals; and means for comparing said difference signal with said reference signal and then producing a discrimination signal which indicates whether the difference signal exceeds the reference signal or not; said ring current and tip current being equal in value when a shorted-to-ground fault does not occur because said currents flow in said ring and tip lines only through said terminal apparatus, said discrimination signal being used for detecting the shorted-to-ground fault;

wherein said first detection signal generating means includes a first transistor with its base connected to said ring line, and a first resistor having one end connected to the emitter of said first transistor and the other end connected to said potential source, said second detection signal generating means includes a second transistor with its base connected to said tip line and a second resistor having one end connected to the emitter of said second transistor and the other end connected to said ground, said comparing means includes a third resistor having one end connected to the collector of said first transistor and the other end connected to said reference signal generating means, an input terminal connected to the connection point between the collector of said first transistor and the one end of said third resistor, and another input terminal connected to the connection point between the emitter of said second transistor and the one end of said second resistor.

3. A current supplying circuit for supplying a current to a terminal apparatus connected between a ring line and a tip line which are connected through resistance elements to a potential source and ground respectively, said current supplying circuit comprising:

means for generating a first detection signal having an amplitude proportional to a ring line current flowing in said ring line;

means for generating a second detection signal having an amplitude proportional to a tip current flowing in said tip line;

means for generating a predetermined reference signal;

means for producing a difference signal which represents the difference between said first and second detection signals;

means for comparing said difference signal with said reference signal and then producing a discrimination signal which indicates whether the difference signal exceeds the reference signal or not; said ring current and tip current being equal in value when a shorted-to-ground fault does not occur because said curents flow in said ring and tip lines only through said terminal apparatus, said discrimination signal being used for detecting the shorted-to-ground fault; and means for increasing the resistance of at least one of said tip and ring lines in response to said discrimination signal indicating a shorted-to-ground fault;

wherein said first detection signal generating means includes means for generating a first potential of an amplitude proportional to the voltage across a first resistor connected to said ring line, said second detection signal generating means includes means for generating a second potential of an amplitude proportional to the voltage across a second resistor connected to said tip line, said difference signal producing means includes means for generating a third potential of an amplitude proportional to the difference between said first and second potentials, and said comparing means includes means for comparing said third potential with the reference signal to produce a signal in accordance with the compared result.

4. A current supplying circuit for supplying a current to a terminal apparatus connected between a ring line and a tip line which are connected through resistance elements to a potential source and ground respectively, said current supplying circuit comprising:

first transistor means including a first transistor having its base connected to said ring line for generating a first detection voltage having an amplitude proportional to a ring line current flowing in said ring line;

second transistor means including a second transistor having its base connected to said tip line for generating a second detection voltage having an amplitude proportional to a tip line current flowing in said tip line;

means for generating a predetermined reference voltage;

means for producing a difference voltage which represents the difference between said first and second detection voltages; and means for comparing said difference voltage with said reference voltage and then producing a discrimination signal showing whether the difference voltage exceeds the reference voltage or not; said ring line current and tip line current being equal in value when a shorted-to-ground fault does not occur because said currents flow in said ring and tip lines only through said terminal apparatus, said discrimination signal being used for detecting the shorted-to-ground fault.

5. A current supplying circuit according to claim 4, wherein said comparing means includes means insensitive to AC signals.

6. A current supplying circuit for supplying a current to a terminal apparatus connected between a ring line and a tip line which are connected through resistance elements to a potential source and ground respectively, said current supplying circuit comprising:
    means for generating a first detection voltage having an amplitude proportional to a ring line current flowing in said ring line;
    means for generating a second detection voltage having an amplitude proportional to a tip line current flowing in said tip line;
    means for generating a predetermined reference voltage;
    means for producing a difference voltage which represents the difference between said first and second detection voltages;
    means for comparing said difference voltage with said reference voltage and then producing a discrimination signal showing whether the difference voltage exceeds the reference voltage or not; said ring line current and tip line current being equal in value when a shorted-to-ground fault does not occur because said currents flow in said ring and tip lines only through said terminal apparatus, said discrimination signal being used for detecting the shorted-to-ground fault; and
    means for holding the output signal from said comparing means and increasing the internal resistance of said current supplying circuit during the output held condition.

7. A current supplying circuit according to claim 6, wherein said internal resistance increasing means includes transistors for shorting resistance means upon its turning on, said resistance means being provided to decrease said ring line current.

8. A current supplying circuit for supplying a current to a terminal apparatus connected between a ring line and a tip line which are connected through resistance elements to a potential source and ground respectively, said current supplying circuit comprising:
    means for generating a first detection voltage having an amplitude proportional to a ring line current flowing in said ring line;
    means for generating a second detection voltage having an amplitude proportional to a tip current flowing in said tip line;
    means for generating a predetermined reference voltage;
    means for producing a difference voltage which represents the difference between said first and second detection voltages; and
    means for comparing said difference voltage with said reference voltage and then producing a discrimination signal showing whether the difference voltage exceeds the reference voltage or not; said ring current and tip current being equal in value when a shorted-to-ground fault does not occur because said currents flow in said ring and tip lines only through said terminal apparatus, said discrimination signal being used for detecting the shorted-to-ground fault;
    wherein said reference voltage generating means has a function to selectively generate first and second reference voltages of different levels and holds the output signal from said comparing means by generating either of said first or second reference voltage in accordance with the output signal from the comparing means.

9. A current supplying circuit for supplying a current to a terminal apparatus connected between a ring line and a tip line which are connected through resistance elements to a potential source and ground respectively, said current supplying circuit comprising:
    means for generating a first detection voltage having an amplitude proportional to a ring line current flowing in said ring line;
    means for generating a second detection voltage having an amplitude proportional to a tip current flowing in said tip line;
    means for generating a predetermined reference voltage;
    means for producing a difference voltage which represents the difference between said first and second detection voltages; and
    means for comparing said difference voltage with said reference voltage and then producing a discrimination signal showing whether the difference voltage exceeds the reference voltage or not; said ring current and tip current being equal in value when a shorted-to-ground fault does not occur because said currents flow in said ring and tip lines only through said terminal apparatus, said discrimination signal being used for detecting the shorted-to-ground fault;
    wherein said first detection voltage generating means includes a first transistor with its base connected to said ring line, and a first resistor having one end connected to the emitter of said first transistor and the other end connected to said potential source, said second detection voltage generating means includes a second transistor with its base connected to said tip line and a second resistor having one end connected to the emitter of said second transistor and the other end connected to said ground, said comparing means includes a third resistor having one end connected to the collector of said first transistor and the other end connected to said reference voltage generating means, an input terminal connected to the connection point between the collector of said first transistor and the one end of said third resistor, and another input terminal connected to the connection point between the emitter of said second transistor and the one end of said second resistor.

10. A current supplying circuit for supplying a current to a terminal apparatus connected between a ring line and a tip line which are connected through resistance elements to a potential source and ground respectively, said current supplying circuit comprising:
    means for generating a first detection signal having an amplitude proportional to a ring line current flowing in said ring line;
    means for generating a second detection signal having an amplitude proportional to a tip current flowing in said tip line;
    means for generating a predetermined reference signal;
    means for producing a difference signal which represents the difference between said first and second detection voltages; and means for comparing the difference signal with said reference signal and then producing a discrimination signal showing whether the difference signal exceeds the reference signal or not; said ring current and tip current being equal in value when a shorted-to-ground fault does not occur because said currents flow in said ring and tip lines only through said terminal apparatus, said discrimination signal being used for detecting the shorted-to-ground fault;

wherein said first detection signal generating means includes first operational amplifier means for generating a first potential of an amplitude proportional to the voltage across a first resistor connected to said ring line, said second detection signal generating means includes second operational amplifier means for generating a second potential of an amplitude proportional to the voltage across a second resistor connected to said tip line, and said difference signal producing means includes third operational amplifier means for generating a third potential of an amplitude proportional to the difference between said first and second potentials, and said comparing means includes fourth operational amplifier means for comparing said third potential with the reference signal to produce a signal in accordance with the compared result.

11. A current supplying circuit for supplying a current to a terminal apparatus connected between a ring line and a tip line which are connected through resistance elements to a potential source and ground respectively, said current supplying circuit comprising:

first current to voltage inverting means including a first transistor having its base connected to said ring line for generating a voltage in proportion to a ring line current on the basis of a predetermined reference voltage, second current to voltage inverting means including a second transistor having its base connected to said tip line for generating a voltage in proportion to a tip line current on the basis of ground potential, and comparing means for comparing an output voltage of said first current to voltage inverting means with that of said second current to voltage inverting means and for outputting a detection signal when said ring line current becomes larger than said tip line current by at least a predetermined current value.

* * * * *